United States Patent
Kronberg et al.

[11] Patent Number: 6,121,716
[45] Date of Patent: Sep. 19, 2000

[54] APPARATUS AND METHOD FOR PREVENTION OF CRACKING IN WELDED BRITTLE ALLOYS

[75] Inventors: James W. Kronberg, Aiken; Robert M. Younkins, New Ellenton, both of S.C.

[73] Assignee: The United States of America as represented by the United States Department of Energy, Washington, D.C.

[21] Appl. No.: 08/891,588

[22] Filed: Jul. 11, 1997

[51] Int. Cl.[7] .................................................. H01L 41/08
[52] U.S. Cl. ............................................. 310/322; 310/317
[58] Field of Search ..................................... 310/317, 322, 310/326

[56] References Cited

U.S. PATENT DOCUMENTS

| | | | |
|---|---|---|---|
| 2,415,832 | 2/1947 | Mason | 310/322 |
| 2,689,947 | 9/1954 | Fry | 310/322 |
| 2,738,172 | 3/1956 | Spiess et al. | 259/1 |
| 2,799,787 | 7/1957 | Guttner et al. | 73/632 |
| 2,939,106 | 5/1960 | Mason | 340/10 |
| 3,285,074 | 11/1966 | Elazar | 310/326 |
| 3,591,862 | 7/1971 | Winston | 310/322 |
| 3,828,773 | 8/1974 | Buch et al. | 310/317 |
| 4,437,604 | 3/1984 | Razon et al. | 228/179 |
| 4,440,983 | 4/1984 | Facoetti et al. | 310/322 |
| 4,466,565 | 8/1984 | Miyazima | 228/1 B |
| 4,768,615 | 9/1988 | Steinebrunner et al. | 181/157 |
| 5,039,978 | 8/1991 | Kronberg | 340/384 R |
| 5,251,490 | 10/1993 | Kronberg | 23/861.25 |
| 5,364,005 | 11/1994 | Whelan et al. | 228/1.1 |
| 5,364,009 | 11/1994 | Takahashi et al. | 228/110.1 |
| 5,462,604 | 10/1995 | Shibano et al. | 134/1 |
| 5,494,207 | 2/1996 | Asanasavest | 228/110.1 |
| 5,495,976 | 3/1996 | Mironesco et al. | 228/110.1 |
| 5,540,807 | 7/1996 | Akiike et al. | 156/580.1 |

FOREIGN PATENT DOCUMENTS

| | | | |
|---|---|---|---|
| 2009720 | 3/1994 | Russian Federation | 310/321 |

*Primary Examiner*—Thomas M. Dougherty
*Attorney, Agent, or Firm*—Dority & Manning

[57] ABSTRACT

An apparatus and method for reducing cracking in a heated material as the material cools. The apparatus includes a variable frequency electric signal generator that is coupled to a transducer. The transducer produces a variable frequency acoustic signal in response to the variable frequency electric signal, which is applied to the heated material to reduce cracking as the material cools.

19 Claims, 1 Drawing Sheet

APPARATUS AND METHOD FOR PREVENTION OF CRACKING IN WELDED BRITTLE ALLOYS

The United States Government has a paid-up license in this invention and the right in limited circumstances to require the patent owner to license others on reasonable terms as provided for by the terms of Contract No. DE-AC09-89R18035 awarded by the United States Department of Energy.

BACKGROUND OF THE INVENTION

1. Field of the Invention

The invention relates generally to the field of welding, and more particularly to welding brittle materials such as cast iron or stainless steel.

2. Description of Related Art

While many methods exist for joining metals together, welding is generally the most preferable because of the following reasons: 1) welding can be used with nearly all metals; 2) welding yields high-strength joints; and 3) welding avoids the galvanic-corrosion problems that can result from soldering or brazing. Metals that are not very reactive, such as steels, can be welded using a simple torch flame, often oxyacetylene, in air. More reactive metals require an electric arc in an inert atmosphere, such as argon, to prevent excessive oxidation.

In the welding process, adjacent regions of two or more discrete pieces of metal are locally heated to the point of fusion and then allowed to run together. Filler metal of similar composition is often added to the molten pool to bridge and unite the separate pieces when the melt cools.

Because welding involves the use of localized high temperatures, and because virtually all materials expand when heated, stress and/or distortion may appear in welded pieces as they cool. In relatively malleable metals, such as steel and wrought iron, this is not a problem since the metal is able to deform slightly and relieve the stress. Moreover, it is relatively simple to position the pieces before the main welding operation through small "tack welds" to minimize the overall distortion after welding.

Unfortunately, welding brittle metals poses a special problem. Examples of brittle metals include cast iron and stainless steel. In the nuclear industry, stainless steel can become highly embrittled through prolonged exposure to high levels of radiation. When such brittle metals cool after welding, the stress cannot be adequately relieved by deformation and cracking occurs instead. Attempts to repair the resulting cracks by further welding serve only to worsen the problem since the resulting stresses create new cracks or cause existing cracks to grow.

Traditionally, cast iron welders used a technique known as "peening" to minimize cracking from a weld. Using this technique, the welder simply taps the metal repeatedly with a hammer up and down the weld seam as it cools. Peening has been proven to be very effective in reducing cracking; however, the exact mechanism by which it works is far from clear.

Not wishing to be limited by this theory, one explanation for the success of peening is that the sharp acoustic waves launched into the metal provide the grain structure of the metal just enough extra energy to slip past each other and relieve stress. Both acoustic and thermal energy are in the form of phonons. However, the phonons resulting from acoustic energy are coherent, in phase, and travel in parallel. Conversely, the phonons resulting from thermal energy are incoherent and travel in random directions with random wavelengths. It is theorized that, due to their coherence, the phonons from peening become focused to relieve stress in the metal and therefore prevent cracking.

While traditional peening has been successful, its effectiveness is due in large part to the skill and intuition of the welder. Thus, for the technique to receive widespread acceptance, it must be refined to produce results that are both reliable and reproducible. Moreover, hazardous applications, such as those involving radioactivity, would require peening to be done remotely to minimize the welders' exposure to radiation.

Modern applications for peening have generally employed a vibrating member to impart the ultrasonic waves into the welded element. For example, U.S. Pat. Nos. 4,466,565 to Miyazima and 5,494,207 to Asanasavest both teach the use of vibrating members to assist in bonding wires on an integrated circuit board or chip. Similarly, U.S. Pat. Nos. 5,364,005 to Whelan et al. and 5,540,807 to Akiike et al. teach the use of a general purpose welding tool that incorporates a vibrating member to generate the ultrasonic waveforms. While these inventions are all useful for their intended purposes, they are not readily adaptable for use in hazardous environments and are generally geared toward micro-weld applications. Thus, there is room for improvement in the art.

SUMMARY OF THE INVENTION

One object of the present invention is to provide an apparatus that can apply an acoustic signal to a heated material to reduce stress and ultimately cracking as the material cools.

Another object of the present invention is to teach a method for applying the acoustic signal to the heated material.

A further object is that the apparatus be usable in hazardous environments, such as those involving radioactivity or toxic agents.

Yet another object is that the acoustic signal be of variable frequency to ensure that the optimum frequency signal for a given material is applied at least part of the time.

According to the present invention, the foregoing and other objects and advantages are attained by an apparatus including a variable frequency electric signal generator that is coupled to a transducer. The transducer produces a variable frequency acoustic signal in response to the variable frequency electric signal, which is then applied to the heated material.

In accordance with one aspect of the invention, the variable frequency electric signal is a square wave. The variable frequency square wave is generated as follows: A waveform generator produces a frequency control signal whose output is fed into a voltage controlled oscillator. The voltage variations in the frequency control signal produce an output signal from the oscillator of variable frequency. The oscillator output signal is then filtered through a clipping network to produce a variable frequency square wave. The square wave may then be amplified as desired for driving the transducer.

In accordance with another aspect of the invention, the transducer includes a piezoelectric crystal interposed between a countermass and a flexible bag holding a liquid. Excited by the variable frequency electric signal, the crystal will deform thereby generating acoustic waves that are transmitted to the heated material through the flexible bag.

The present invention provides a general purpose method and apparatus that can be used to apply a variable frequency acoustic signal to a heated material. The invention makes use of electronic components and can be applied without human proximity to the subject material.

Additional objects and advantages will become apparent from a consideration of the following description and drawings.

DETAILED DESCRIPTION

With reference to the figures, an apparatus that achieves all the various objects of the present invention will now be described.

Figure 1:
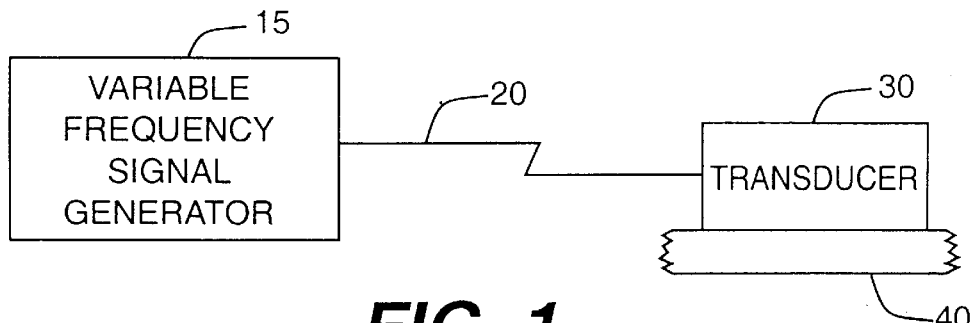
FIG. 1 is a block diagram of an apparatus according to the invention.

FIG. 1 provides a high level overview of the two main components of the present invention: variable frequency signal generator 15 and transducer 30. During a manual peening process of cast iron, sound waves of varying frequencies are transmitted into the metal based on the position and/or thrust of the hammer. Since no scientific analysis is known to have been carried out to determine what frequencies are most effective for a given metal, temperature, thickness, etc., it is critical that transducer 30 produce acoustic signals of various frequencies. This ensures that the most effective frequencies will not be inadvertently omitted. To accomplish this, signal generator 15 can produce either a simple signal having a continuously varying frequency, or a complex tone containing many frequencies. Transducer 30 is designed to respond to the signal delivered from signal generator 15 by producing acoustic signals of like frequency, which are then transmitted into material 40. It is envisioned that modern data collection methods will allow a Fourier analysis to be performed on the waveforms transmitted through various materials to determine optimum frequencies for prevention of cracking. As these frequencies are discovered, signal generator 15 can be tuned to produce them depending on the particular application.

Signal generator 15 is coupled to transducer 30 via cable 20. Cable 20 must be of sufficient quality to minimize signal degradation, particularly in applications involving hazardous conditions. For example, when radioactivity is involved, it is preferred to limit exposure to just cable 20 and transducer 30 for the protection of the welder and the electronic components. Thus, cable 20 may in some circumstances be quite lengthy. Transducer 30 will commonly be manipulated by a mechanical arm or carriage for safety purposes.

Figure 2:
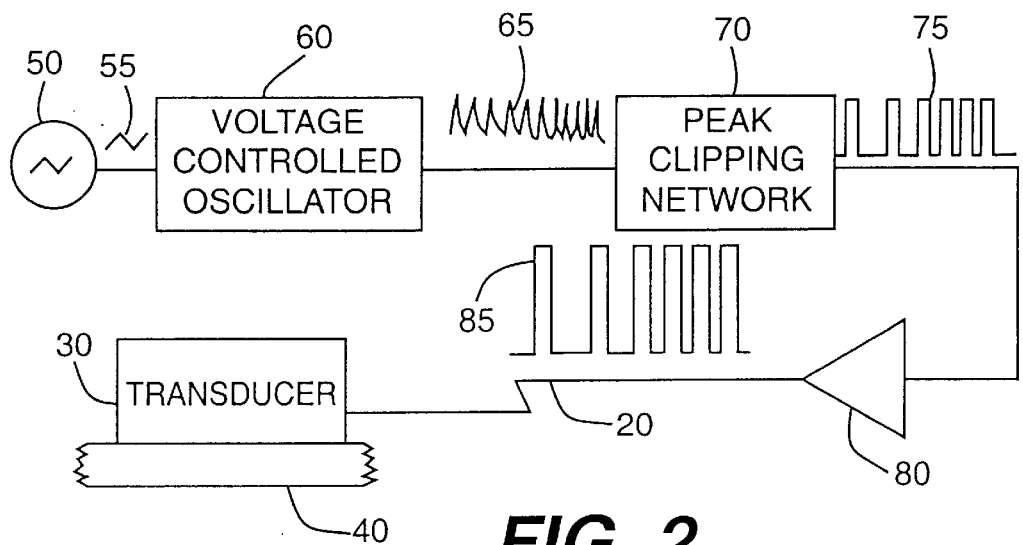
FIG. 2 is a detailed block diagram of one embodiment of the invention that illustrates the components involved in generating a variable frequency square wave and the associated signals generated at various stages in the process.

FIG. 2 depicts a preferred embodiment of the present invention where a variable frequency square wave is produced for driving transducer 30. In this embodiment, signal generator 50 is used to produce triangle wave 55 for input to voltage controlled oscillator 60. A triangle wave is chosen because, as will be discussed in reference to FIG. 3 below, it will ultimately produce a square wave whose frequency varies linearly. Nevertheless, any alternating current waveform will suffice. Voltage controlled oscillator 60 produces oscillator output signal 65 that varies in frequency in direct relationship to triangle wave 55 applied to its input. Because oscillator output signal 65 may contain sharp voltage peaks depending on the type of oscillator used, oscillator output signal 65 is preferably filtered through peak clipping network 70 to form standard square wave 75.

Figure 3:
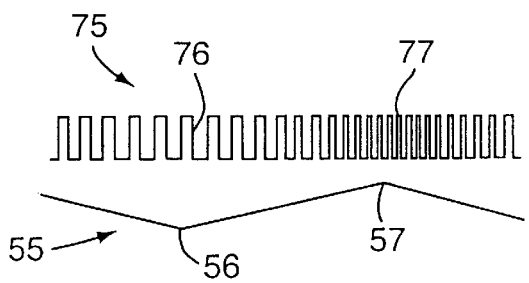
FIG. 3 depicts the relationship between the triangle wave and the variable frequency square wave shown in FIG. 2.

The relationship between triangle wave 55 and square wave 75 is shown best in FIG. 3. When triangle wave 55 is at low voltage point 56, square wave 75 is running at its slowest frequency corresponding to reference numeral 76. Similarly, when triangle wave 55 is at high voltage point 57, square wave 75 is running at its highest frequency corresponding to reference numeral 77. Because triangle wave 55 changes voltages linearly, the variations in frequency produced by voltage controlled oscillator 60 are also linear. It should be readily apparent that a non-linear waveform chosen for input to voltage controlled oscillator 60 will produce non-linear frequency variations in square wave 75. In the preferred embodiment, the frequency of square wave 75 should vary between 5 kHz and 20 kHz.

Once square wave 75 emerges from clipping network 70, it is usually fed through amplifier 80 to produced amplified square wave 85 that is suitable for transmission over cable 20 to transducer 30. Preferably, the voltage levels of square wave 85 are chosen so that the output power required is in the range of 100 watts.

Figure 4:
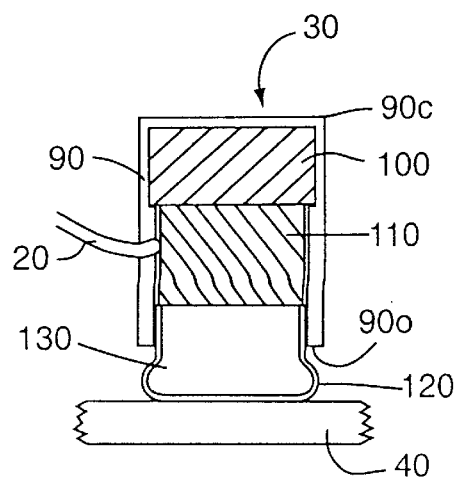
FIG. 4 illustrates one embodiment of a transducer according to the present invention.

Turning next to transducer 30, FIG. 4 provides a cut-away view of the internal components of a preferred transducer according to the present invention. Transducer 30 is comprised of low-density housing 90 having open end $90_o$ and closed end $90_c$. Countermass 100 is lodged in closed end $90_c$ and flexible bag 120 is held in open end $90_o$. Piezoelectric crystal 110 is held between countermass 100 and flexible bag 120. Crystal 110 is electrically connected to cable 20 through housing 90. In the preferred embodiment, crystal 110 is made from lead-zirconium titanate. Application of an electrical signal to crystal 110 through cable 20 will cause rapid deformations in crystal 110 in relationship to the frequencies contained in the applied signal. These deformations are acoustically coupled to material 40 through flexible bag 120.

Flexible bag 120 is filled with dense liquid 130 that will neither freeze nor boil over the expected range of temperatures of use. Mercury can be used for dense liquid 130; however, because of Mercury's toxicity, a compound consisting of gallium (70% by weight), indium (24% by weight), and tin (6% by weight) is preferred. The cover of flexible bag 120 should be made from a heat resistant material that will retain the type of liquids discussed above. Fiberglass cloth impregnated with silicone rubber has proven effective for this purpose.

For maximum effect, the acoustic signals generated by deformations in crystal 110 are passed substantially through flexible bag 120 and into material 40. Acoustic losses will be minimized if the acoustic impedance of transducer 30 is matched to material 40. A discussion of acoustic impedance and its significance is contained in U.S. Pat. No. 5,251,490 to Kronberg and is incorporated herein by reference. Nevertheless, it has been found that flexible bag 120 and liquid 130 form a continuous acoustic path between crystal 110 and material 40 so that acoustic losses are minimal.

The above description is given in reference to an apparatus that can apply a multi-frequency acoustic signal to a heated material to reduce stress and ultimately cracking as the material cools. However, it is understood that many variations are apparent to one of ordinary skill in the art from a reading of the above specification and such variations are within the spirit and scope of the invention as defined by the following appended claims:

That which is claimed:

1. An apparatus for applying a variable frequency acoustic signal to a heated material comprising:
    means for generating a variable frequency electric signal; and
    a transducer comprised of a housing having an open end and a closed end, a countermass held in said closed end, a flexible bag held in said open end and a crystal located between said countermass and said flexible bag;
    said transducer coupled to said electric signal generation means and producing said variable frequency acoustic signal in response to said variable frequency electric signal for output to said material;
    whereby application of said variable frequency acoustic signal to said heated material relieves stress in said heated material as said material cools.

2. The apparatus of claim 1, wherein said electric signal is a square wave and said electric signal generation means comprises:
    a waveform generator producing a frequency control signal;
    a voltage controlled oscillator coupled to said waveform generator and producing an oscillator output signal of variable frequency in response to said frequency control signal; and
    means coupled to said voltage controlled oscillator for converting said oscillator output signal into said variable frequency square wave.

3. The apparatus of claim 2, wherein said square wave generation means further comprises:
    means coupled to said conversion means for amplifying said variable frequency square wave.

4. The apparatus of claim 2, wherein said variable frequency square wave varies continuously between 5 kHz and 20 kHz.

5. The apparatus of claim 1, wherein said transducer further comprises:
    said flexible bag containing a liquid; and
    said bag extending from said open end for acoustic communication with said material;
    said crystal being a piezoelectric crystal interposed between said countermass and said flexible bag; and
    means for coupling said variable frequency electric signal to said crystal.

6. The apparatus of claim 5, wherein said piezoelectric crystal is made of lead-zirconium titanate.

7. The apparatus of claim 5, wherein said bag is made from fiberglass cloth impregnated with silicone rubber.

8. The apparatus of claim 5, wherein said liquid is mercury.

9. The apparatus of claim 5, wherein said liquid comprises the following elements by weight:
    approximately 70% gallium;
    approximately 24% indium; and
    approximately 6% tin.

10. The apparatus of claim 2, wherein said transducer comprises:
    a housing having an open end and a closed end;
    a countermass held in said closed end;
    a flexible bag held in said open end and extending therefrom for acoustic communication with said material;
    a piezoelectric crystal interposed between said countermass and said flexible bag; and
    means for coupling said variable frequency square wave to said crystal.

11. The apparatus of claim 10, wherein said piezoelectric crystal is made of lead-zirconium titanate.

12. The apparatus of claim 10, wherein said bag is made from fiberglass cloth impregnated with silicone rubber.

13. The apparatus of claim 10, wherein said liquid is mercury.

14. The apparatus of claim 10, wherein said liquid comprises the following elements by weight:
    approximately 70% gallium;
    approximately 24% indium; and
    approximately 6% tin.

15. An apparatus for applying a variable frequency acoustic signal to a heated material comprising:
    a waveform generator producing a frequency control signal;
    a voltage controlled oscillator coupled to said waveform generator and producing an oscillator output signal of variable frequency in response to said frequency control signal;
    means coupled to said voltage controlled oscillator for converting said oscillator output signal of variable frequency into a variable frequency square wave, said variable frequency square wave varying continuously between 5 kHz and 20 kHz;
    means coupled to said converting means for amplifying said variable frequency square wave; and
    a transducer coupled to said amplification means and producing said variable frequency acoustic signal in response to said amplified variable frequency square wave for output to said material, comprising:
    a housing having an open end and a closed end;
    a countermass held in said closed end;
    a flexible bag held in said open end and extending therefrom for acoustic communication with said material;
    a piezoelectric crystal interposed between said countermass and said flexible bag; and
    means for coupling said amplified variable frequency square wave to said crystal;
    whereby application of said variable frequency acoustic signal to said heated material relieves stress in said heated material as said material cools.

16. A method for applying a variable frequency acoustic signal to a heated material, comprising the following steps:
    providing an apparatus for applying a variable frequency acoustic signal to a heated material comprising a means for generating a variable frequency electric signal, and a transducer having a housing with an open end and a closed end, a countermass held in said closed end, a flexible bag held in said open end and a crystal located between said countermass and said flexible bag, said transducer coupled to said electric signal generation means and producing said variable frequency acoustic signal in response to said variable frequency electric signal for output to said material;
    generating a variable frequency electric signal;
    producing said variable frequency acoustic signal in response to said variable frequency electric signal for output to said material; and
    relieving stress in said heated material as said material cools by applying said variable frequency acoustic signal to said heated material.

17. The method of claim 16, wherein said electric signal is a square wave and generating said variable frequency square wave comprises the steps of:

producing a frequency control signal;

producing an oscillator output signal of variable frequency in response to said frequency control signal; and converting said oscillator output signal of variable frequency into said variable frequency square wave.

18. The method of claim 17, wherein generating said variable frequency square wave further comprises the step of:

amplifying said variable frequency square wave.

19. The method of claim 17, wherein said variable frequency square wave varies continuously between 5 kHz and 20 kHz.

* * * * *